(12) United States Patent
Grobis et al.

(10) Patent No.: US 8,355,300 B2
(45) Date of Patent: Jan. 15, 2013

(54) THERMALLY-ASSISTED RECORDING (TAR) PATTERNED-MEDIA DISK DRIVE WITH OPTICAL DETECTION OF WRITE SYNCHRONIZATION AND SERVO FIELDS

(75) Inventors: Michael Konrad Grobis, San Jose, CA (US); Manfred Ernst Schabes, Saratoga, CA (US); Barry Cushing Stipe, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 252 days.

(21) Appl. No.: 12/898,381

(22) Filed: Oct. 5, 2010

(65) Prior Publication Data

US 2012/0082015 A1   Apr. 5, 2012

(51) Int. Cl.
*G11B 11/00* (2006.01)
(52) U.S. Cl. .................................. 369/13.33; 369/13.13
(58) Field of Classification Search ............... 369/13.33, 369/13.13, 13.32, 112.09, 112.14, 112.21, 369/112.27, 300; 360/59, 51, 31, 75, 60; 385/129, 31, 88–94; 29/603.07; 250/201.3, 250/201.5
See application file for complete search history.

(56) References Cited

U.S. PATENT DOCUMENTS

| | | | |
|---|---|---|---|
| 6,620,532 B2 | 9/2003 | Aoyama | |
| 6,643,082 B1 | 11/2003 | Belser | |
| 7,609,469 B2 | 10/2009 | Gage et al. | |
| 7,675,703 B2* | 3/2010 | Albrecht et al. | ................. 360/51 |
| 7,715,137 B2 | 5/2010 | Albrecht | |
| 7,796,353 B2* | 9/2010 | Schabes et al. | ................. 360/59 |
| 8,081,542 B1* | 12/2011 | Grobis et al. | ............. 369/13.33 |
| 2010/0061018 A1 | 3/2010 | Albrecht et al. | |
| 2010/0091618 A1 | 4/2010 | Schabes et al. | |

FOREIGN PATENT DOCUMENTS

| | | |
|---|---|---|
| JP | 2004303302 | 10/2004 |
| JP | 2008130187 | 6/2008 |
| JP | 2010020851 | 1/2010 |
| JP | 2012079402 A * | 4/2012 |
| WO | 2009084179 A1 | 7/2009 |

* cited by examiner

*Primary Examiner* — Tan X Dinh
(74) *Attorney, Agent, or Firm* — Thomas R. Berthold

(57) ABSTRACT

A thermally-assisted recording (TAR) bit-patterned-media (BPM) magnetic recording disk drive uses optical detection of synchronization fields for write synchronization and optical detection of servo sectors for read/write head positioning. The synchronization fields and servo sectors extend generally radially across the data tracks and are patterned into discrete nondata blocks separated by gaps in the along-the-track direction. A near-field transducer (NFT) directs laser radiation to the disk and generates a power absorption profile on the disk that has a characteristic along-the-track spot size less than the along-the-track length of the gaps between the nondata blocks in the synchronization fields and servo sectors. A sensor provides an output signal in response to radiation from the nondata blocks and gaps in the synchronization fields and servo sectors as the disk rotates to control the timing of the magnetic write field applied to the data islands and to control the positioning of the read/write head on the data tracks.

26 Claims, 8 Drawing Sheets

THERMALLY-ASSISTED RECORDING (TAR) PATTERNED-MEDIA DISK DRIVE WITH OPTICAL DETECTION OF WRITE SYNCHRONIZATION AND SERVO FIELDS

BACKGROUND OF THE INVENTION

1. Field of the Invention

This invention relates to a thermally-assisted recording (TAR) type of magnetic recording disk drive that uses patterned media, wherein each data bit is stored in a magnetically isolated island on the disk, and more particularly to servo control and write synchronization in this type of disk drive.

2. Description of the Related Art

Magnetic recording hard disk drives with patterned magnetic recording media, also called bit-patterned media (BPM), have been proposed to increase the data density. In patterned media, the magnetic material on the disk is patterned into small isolated data islands or islands arranged in concentric data tracks. Each island contains a single magnetic "bit" and is separated from neighboring islands by a nonmagnetic region. This is in contrast to conventional continuous media wherein a single "bit" is composed of multiple weakly-coupled neighboring magnetic grains that form a single magnetic domain and the bits are physically adjacent to one another. Patterned-media disks may be longitudinal magnetic recording disks, wherein the magnetization directions are parallel to or in the plane of the recording layer, or perpendicular magnetic recording disks, wherein the magnetization directions are perpendicular to or out-of-the-plane of the recording layer. To produce the required magnetic isolation of the patterned islands, the magnetic moment of the regions between the islands must be destroyed or substantially reduced so as to render these regions essentially nonmagnetic. Alternatively, the media may be fabricated so that that there is substantially no magnetic material in the regions between the islands.

In one type of patterned media, the data islands are elevated, spaced-apart pillars that extend above the disk substrate surface to define troughs or trenches on the substrate surface between the pillars. This type of patterned media is of interest because substrates with the pre-etched pattern of pillars and trenches can be produced with relatively low-cost, high volume processes such as lithography and nanoimprinting. The magnetic recording layer material is then deposited over the entire surface of the pre-etched substrate to cover both the ends of the pillars and the trenches. The trenches are recessed far enough from the read/write head to not adversely affect reading or writing.

Patterned-media disk drives, like conventional continuous-media disk drives, are also required to have a servo control system for positioning the read/write heads to the desired tracks and maintaining them on track during reading and writing. This is typically accomplished with dedicated non-data servo regions or sectors angularly spaced around the disk. In patterned-media disks, nondata servo regions have been proposed that contain discrete servo islands or blocks separated by nonmagnetic spaces. The servo blocks are patterned into a position error signal (PES) field that generates a servo readback signal that is detected by the read head and demodulated into a PES for positioning the read/write head to the desired data track and maintaining it on track.

In addition to nondata servo regions, patterned-media disks have been proposed that also have nondata synchronization fields for write synchronization. Unlike conventional magnetic recording where the data bits are written on continuous media, the magnetic transitions between discrete data islands in patterned-media disks are restricted to predetermined locations governed by the locations of individual data islands. It is thus necessary to synchronize the reversal of write current in the write head with the passing of individual data islands under the head. The nondata synchronization fields are detected by the read head and used to synchronize the write head. U.S. Pat. No. 7,675,703 B2, assigned to the same assignee as this application, describes a patterned-media disk drive with nondata write synchronization fields.

Heat-assisted magnetic recording (HAMR), also called thermally-assisted recording (TAR), has been proposed. In TAR systems, an optical waveguide with a near-field transducer (NFT) directs heat from a radiation source, such as a laser, to heat localized regions of the magnetic recording layer on the disk. The radiation heats the magnetic material locally to near or above its Curie temperature to lower the coercivity enough for writing to occur by the write head. TAR systems have been proposed for patterned-media disk drives, wherein each data island is heated so that the coercivity of the magnetic material is lowered when the magnetic write field from the write head is applied to the island.

Patterned-media TAR disk drives also require servo control systems and write synchronization. The servo control systems proposed for patterned-media TAR disk drives are the same as for patterned-media disk drives without thermal assistance and thus use magnetic nondata servo regions angularly spaced around disk that are detected by the read head. Magnetic servo schemes suffer from the problem that the write clock is only updated every servo sector, thus making the system susceptible to disturbances and drift between the updates. Packing the servo sectors closer together uses up storage space. Schemes that do not rely on magnetic readback of the nondata servo regions have the benefit of not needing to stop the write process during servo readback because the servo signal is not corrupted by the magnetic fields generated during the write process. This allows a lower overall storage overhead for implementing the servo.

For write synchronization, an optical technique has been proposed that uses the actual data islands rather than dedicated synchronization fields. For example, U.S. patent application Ser. No. 12/209,089, filed Sep. 11, 2008, published as US 2010/0061018 A1 and assigned to the same assignee as this application, describes a patterned-media TAR disk drive that uses a radiation detector instead of the read head to detect reflected radiation from the data islands, with the radiation detector output being used to control the clocking of write pulses from the write head. However, the radiation absorption contrast can be quite low in systems that seek to maximize areal density and the thermal stability and writability of the data islands. Radiation variation detection schemes work best for data islands that have wide gaps between island edges, which is not desirable for high density BPM.

What is needed is a patterned-media TAR disk drive that has servo control and write synchronization that does not rely on magnetic readback from nondata regions, but which still provides adequate signal-to-noise ratios.

SUMMARY OF THE INVENTION

The invention relates to a TAR patterned-media magnetic recording disk drive that uses optical detection of synchronization fields for write synchronization and optical detection of servo sectors for read/write head positioning. The TAR disk is a BPM disk with nondata synchronization fields and servo sectors extending generally radially across the patterned data tracks, with each nondata synchronization field and servo sector patterned into discrete nondata blocks separated by gaps in the along-the-track direction. The carrier for the read and write heads also supports an optical channel with a near-field transducer (NFT) that directs laser radiation to the disk. The NFT generates a power absorption profile on the disk with a characteristic along-the-track spot size less than the along-the-track length of the gaps between the nondata blocks in the synchronization fields and servo sectors. A sensor provides an output signal in response to radiation from the nondata blocks and gaps in the synchronization fields and the servo sectors as the disk rotates. The sensor output signal from the synchronization fields controls the timing of the magnetic write field applied to the data islands by the write head. The sensor output signal from the servo sectors also controls the positioning of the read/write head on the data tracks.

For a fuller understanding of the nature and advantages of the present invention, reference should be made to the following detailed description taken together with the accompanying figures.

DETAILED DESCRIPTION OF THE INVENTION

Figure 1:
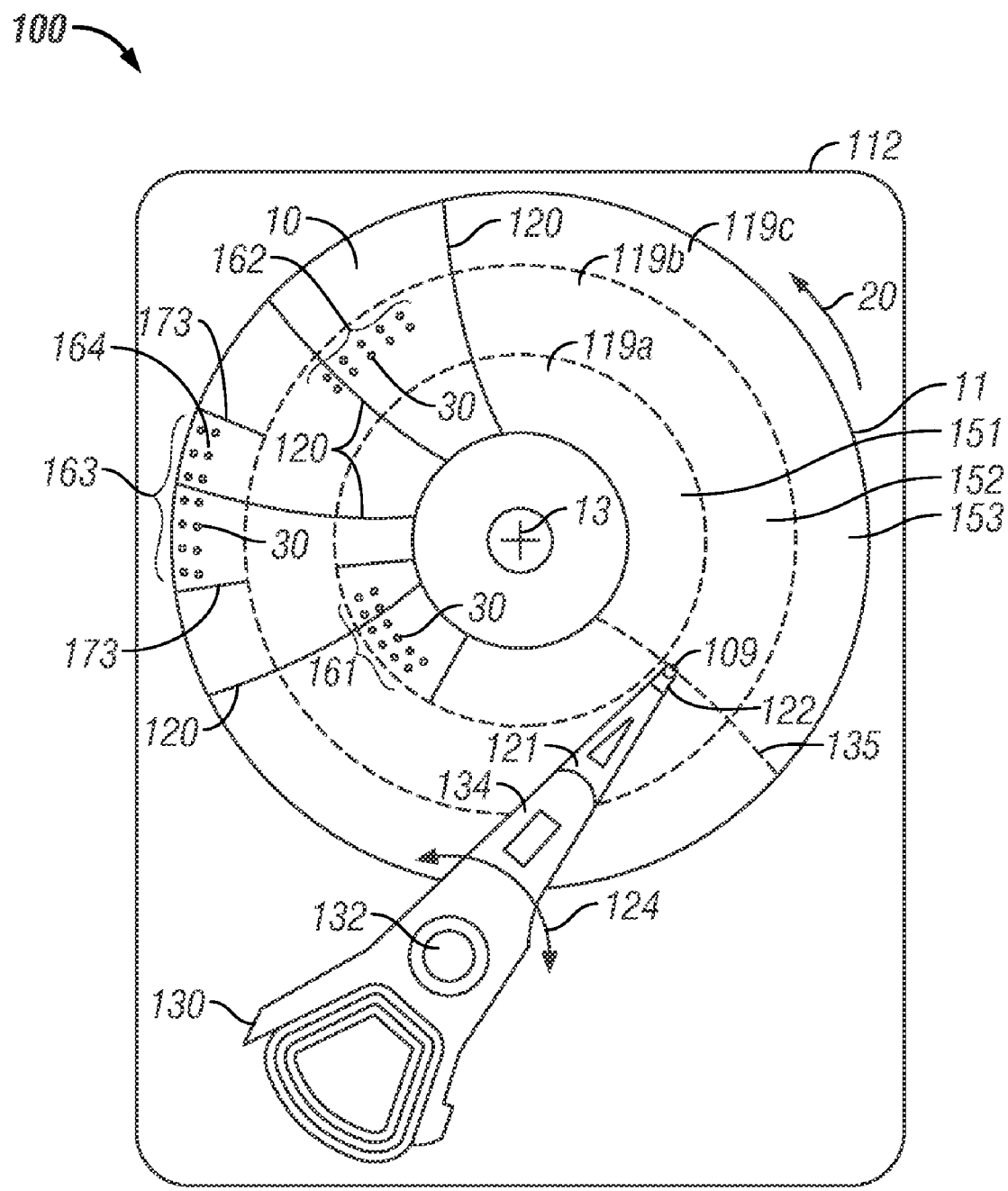
FIG. 1 is a top view of a patterned-media disk drive that operates without thermal assistance as proposed in the prior art.

FIG. 1 is a top view of a patterned-media disk drive 100, as proposed in the prior art, that does not use thermal assistance. The drive 100 has a housing or base 112 that supports an actuator 130 and a spindle motor (not shown) for rotating the patterned magnetic recording disk 10 about its center 13. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier, such as an air-bearing slider 122, attached to the other end of suspension 121. The suspension 121 permits the head carrier 122 to be maintained very close to the surface of disk 10. The slider 122 supports the read/write or recording head 109. The recording head 109 is typically a combination of an inductive write head with a magnetoresistive read head (also called a read/write head) and is located on the trailing end or end face of the slider 122. Only one disk surface with associated slider and recording head is shown in FIG. 1, but there are typically multiple disks stacked on a hub that is rotated by a spindle motor, with a separate slider and recording head associated with each surface of each disk.

The patterned magnetic recording disk 10 includes a disk substrate 11 and discrete data islands 30 of magnetizable material on the substrate 11. The data islands 30 function as discrete magnetic bits for the storage of data. Each discrete data island 30 is a magnetized block separated from other blocks by nonmagnetic regions or spaces. The term "nonmagnetic" means that the spaces between the data islands are formed of a nonferromagnetic material, such as a dielectric, or a material that has no substantial remanent moment in the absence of an applied magnetic field, or a magnetic material in a groove or trench recessed far enough below the blocks to not adversely affect reading or writing. The nonmagnetic spaces between the data islands may also be the absence of magnetic material, such as grooves or troughs in the magnetic recording layer or disk substrate.

The data islands 30 are arranged in radially-spaced circular tracks, with the tracks being grouped into annular bands or zones 151, 152, 153. Within each track, the data islands 30 are typically arranged in fixed-byte-length data sectors (e.g., 512 bytes or 4096 bytes plus additional bytes for error correction coding (ECC) and data sector header). The number of data sectors is different in each zone. The grouping of the data tracks into annular zones permits banded recording, wherein the angular spacing of the data islands, and thus the data rate, is different in each zone. In FIG. 1, three zones 151, 152, 153 are shown, with only portions of representative concentric data tracks, 161, 162, 163, being shown for each respective zone. While only three zones are depicted in FIG. 1, modern disk drives typically have about 20 zones. In each zone there are also dedicated nondata regions that contain generally radially-directed synchronization (sync) marks, like typical sync marks 173 in zone 153. Each sync mark 173 may be plurality of circumferentially-spaced marks, with the spacing being different in each zone, that are detected by the read head to enable the write head to be synchronized with the specific spacing of the data islands in that zone. The data regions between successive sync marks, like data region 164 between sync marks 173 in zone 153, include multiple fixed-byte-length data sectors. The sync marks may be located in the sector headers of certain data sectors. The physical location where data is to be written or read is identified by a head number, track number (also called "cylinder" number when there are multiple disks) and data sector number.

As the disk 10 rotates about its center 13 in the direction of arrow 20, the movement of actuator 130 allows the read/write head 109 on the trailing end of head carrier 122 to access different data tracks and zones on disk 10. Because the actuator 130 is a rotary actuator that pivots about pivot 132, the path of the read/write head 109 across the disk 10 is not a perfect radius but instead an arcuate line 135.

Each data track also includes a plurality of circumferentially or angularly-spaced dedicated nondata servo regions or sectors 120 that contain positioning information detectable by the read head for moving the head 109 to the desired data tracks and maintaining the head 109 on the data tracks. The servo sectors in each track are aligned circumferentially with the servo sectors in the other tracks so that they extend across the tracks in a generally radial direction, as represented by radially-directed servo sectors 120. The servo sectors 120 have an arcuate shape that generally replicates the arcuate path 135 of the head 109. The servo sectors 120 are nondata regions on the disk that are magnetized once, typically during manufacturing or formatting of the disk, and are not intended to be erased during normal operation of the disk drive. While the sync marks (like sync marks 173) may be located in the sector headers for the data sectors, as an alternative they may be located in the servo sectors 120.

Figure 2:
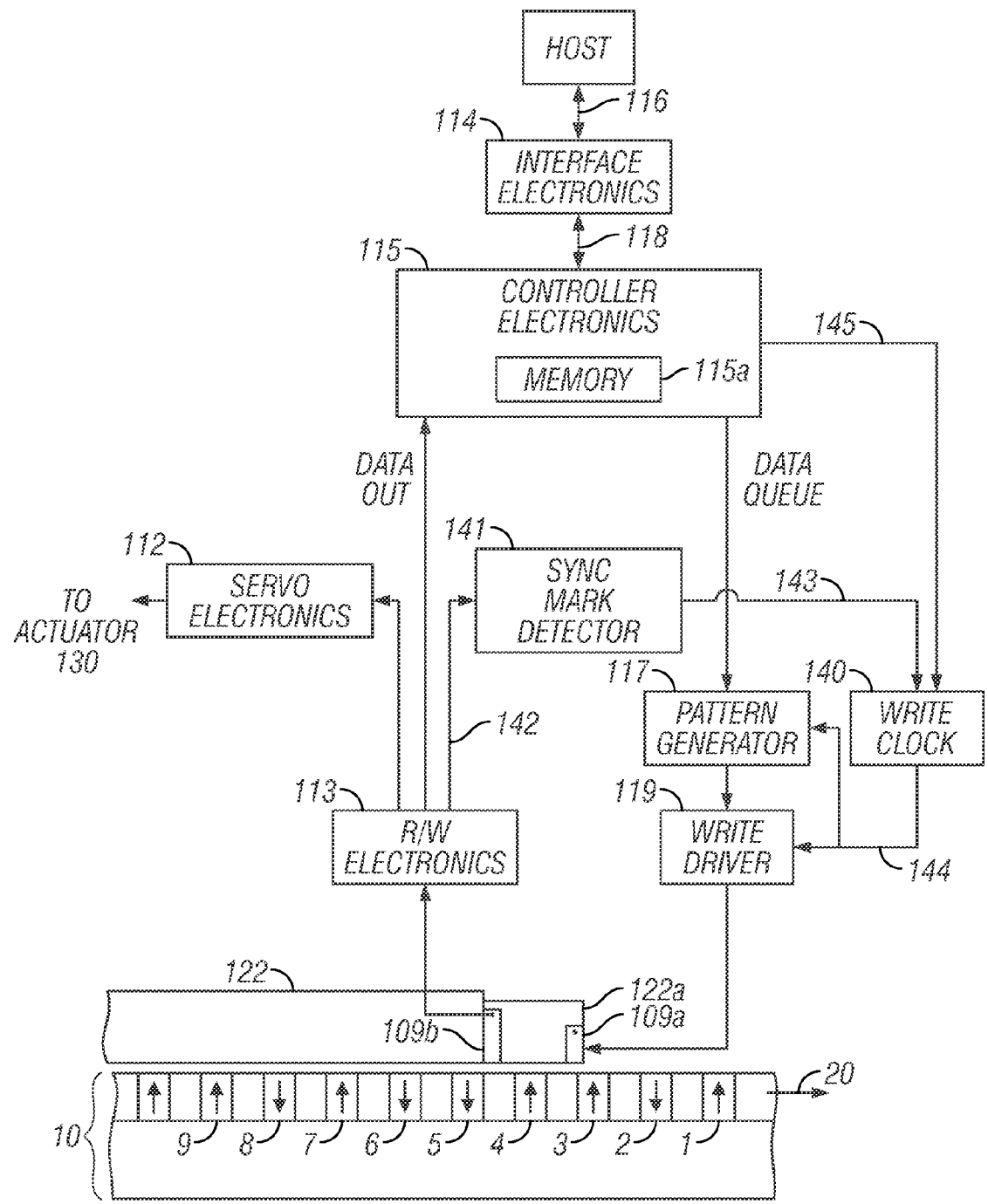
FIG. 2 is a block diagram of the electronics associated with a patterned-media disk drive as proposed in the prior art and also shows a sectional view of the patterned magnetic recording disk.

FIG. 2 is a block diagram of the electronics associated with disk drive 100 and also shows a sectional view of the magnetic recording disk 10 with a magnetic recording layer of patterned media in the form of discrete magnetizable data islands 1-9. FIG. 2 also shows a portion of slider 122 with read/write head 109 that includes the magnetoresistive read element or head 109b and the write element or head 109a. The read head 109b and write head 109a are formed on the trailing end 122a of slider 122. The arrows depicted in the islands 1-9 represent the magnetic moments or magnetization directions in the islands, and are depicted for perpendicular or out-of-plane magnetic recording. The recording or writing of data occurs by an inductive coil write head 109a that has a write pole that generates a magnetic field to magnetize the islands in one of the two magnetization directions, depending on the direction of current through the coil of the write head. Because there is no magnetic material between the islands 1-9, the write pulses must be precisely timed to magnetize the appropriate islands.

The disk drive electronics include read/write (R/W) electronics 113, servo electronics 112, controller electronics 115 and interface electronics 114. The R/W electronics 113 receives signals from read head 109b and passes servo information from the servo sectors 120 to servo electronics 112 and data signals from the data sectors to controller electronics 115. Servo electronics 112 typically includes a servo control processor that uses the servo information from the servo sectors 120 to run a control algorithm that produces a control signal. The control signal is converted to a current that drives rotary actuator 130 to position the head 109. Interface electronics 114 communicates with a host system (not shown) over interface 116, passing data and command information. Interface electronics 114 also communicates with controller electronics 115 over interface 118. Interface electronics 114 receives a request from the host system, such as a personal computer (PC), for reading from or writing to the data sectors over interface 116. Controller electronics 115 includes a microprocessor and associated memory 115a. Controller electronics 115 receives a list of requested data sectors from interface electronics 114 and converts them into a set of numbers that uniquely identify the disk surface (head number associated with that disk surface), track and data sector. The numbers are passed to servo electronics 112 to enable positioning head 109 to the appropriate data sector.

FIG. 2 also shows schematically the transfer of data between a host system, such as a PC, and the disk drive 100. The signals from recorded data islands in the data sectors are detected by read head 109b, and amplified and decoded by read/write electronics 113. Data is sent to controller electronics 115 and through interface electronics 114 to the host via interface 116. The data to be written to the disk 10 is sent from the host to interface electronics 114 and controller electronics 115 and then as a data queue to pattern generator 117 and then to write driver 119. The write driver 119 generates high-frequency current pulses to the coil of write head 109a which results in the magnetic write fields that magnetize the data islands 1-9. The write clock 140, which is capable of operating at different frequencies corresponding to the different data zones, outputs a clock signal on line 144 to control the timing of pattern generator 117 and write driver 119. A sync mark detector 141 receives the readback signal from R/W electronics 113 on input line 142 and outputs a signal on line 143 to control the timing of write clock 140. The sync mark detector 141 detects the sync marks (like sync marks 173 in FIG. 1) from R/W electronics 113. The sync mark spacing in each zone is different so sync mark detector 141 enables the write clock 140 to be synchronized with the spacing of the data islands in each of the different zones.

Figure 3:
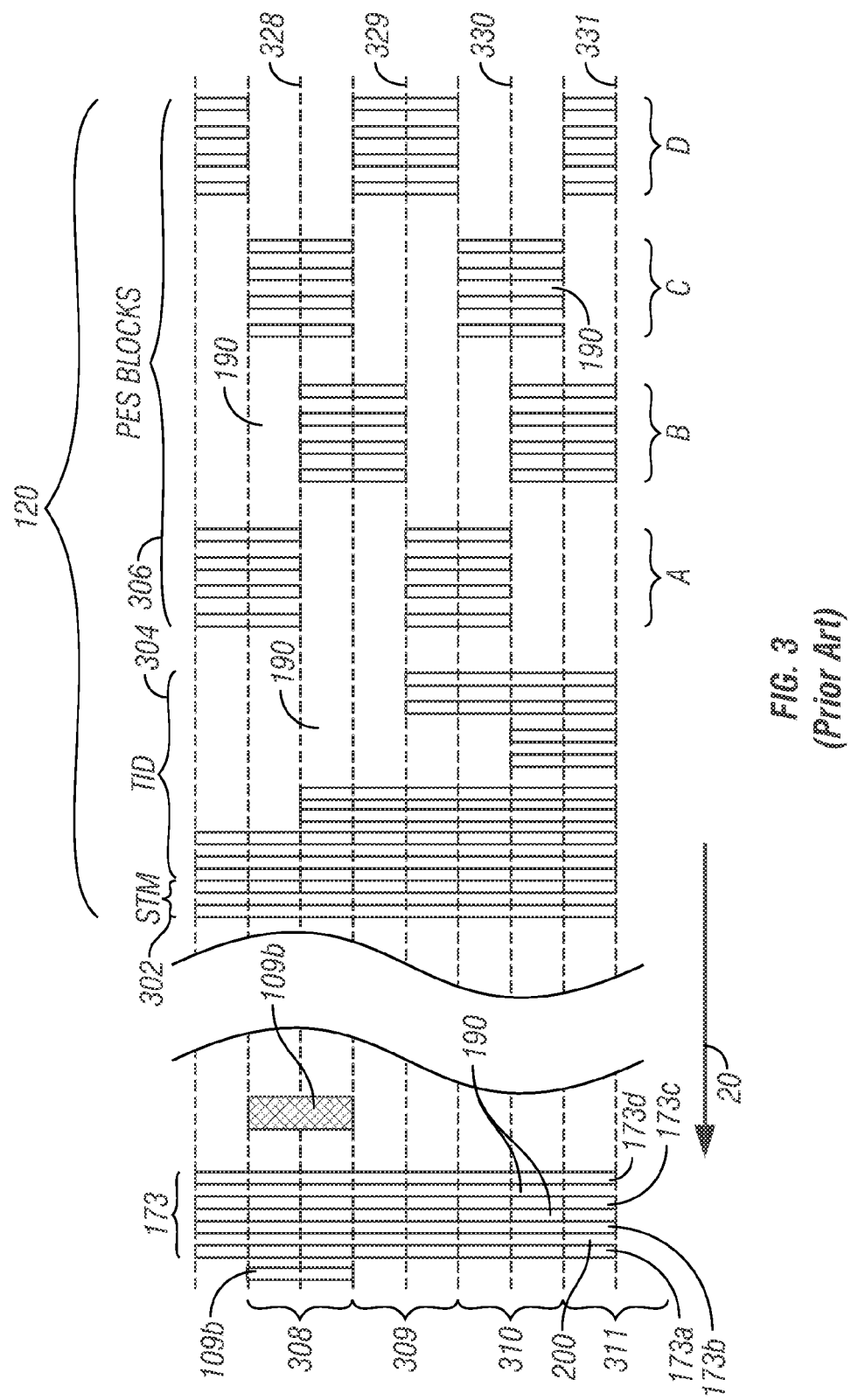
FIG. 3 is a schematic showing a portion of a patterned-media disk with a patterned synchronization field and a patterned servo sector spanning several data tracks, as proposed in the prior art.

FIG. 3 is a schematic showing a portion of the patterned-media disk 10 with a patterned nondata sync field 173 and a patterned nondata servo sector 120 spanning several data tracks, as proposed in the prior art. Four full data tracks are depicted: 308, 309, 310 and half-track 311, each having a respective track centerline 328, 329, 330 and 331. The read head 109b is shown as positioned in data track 308 and will detect the nondata islands in sync field 173 and servo sector 120 as the disk rotates in the direction of arrow 20.

The sync field 173 is depicted with four sync marks as magnetized nondata islands 173a-173d separated by nonmagnetic spaces. The sync marks are stripes that extend across the data tracks in the radial direction, resulting in a single-frequency pattern suitable for locking a phase-locked-loop data clock prior to reading or writing data bits in the data sectors.

The servo sector 120 is a conventional servo pattern of the type commonly used in sector servo systems of conventional continuous-media disk drives and shows a greatly simplified pattern for clarity. The servo pattern includes several fields containing nondata islands, three of which are shown as servo-timing-mark (STM) field 302, track ID (TID) field 304 and position-error-signal (PES) field 306 depicted as the well-known quadrature pattern of four PES fields comprising groups of islands A-D. The PES islands in groups A-D are used to determine the fractional part of the radial position of the head. When the head is at the track centers the read-back signal amplitudes from the group A islands and the group B islands are equal. When the head is at the half-track positions the amplitudes from the group C islands and the group D islands are equal. As the head moves off-track the amplitudes from all the islands will increase or decrease. The amplitudes of the PES islands are decoded in servo electronics 112 and used to reposition the head.

In FIG. 3 all of the islands in sync field 163, data sector 164 and servo sector 120 are discrete nondata islands of magnetic material and are magnetized in the same perpendicular direction, either into or out of the paper in FIG. 3. The islands are typically DC-magnetized by a large magnet during manufacturing. Each discrete island is a magnetized island separated from other islands by nonmagnetic spaces represented as 190. The term "nonmagnetic" means that the spaces 190 between the islands are formed of a nonferromagnetic material, such as a dielectric, or a material that has no substantial remanent moment in the absence of an applied magnetic field, or a magnetic material in a groove or trench recessed far enough below the islands to not adversely affect reading or writing. The nonmagnetic spaces 190 may also be the absence of magnetic material, such as grooves or troughs in the magnetic recording layer or disk substrate. The nonmagnetic spaces 190 may also be formed of nonmagnetic polymeric material if the grooves or trenches are filled with a polymeric material to substantially planarize the disk.

This invention is a patterned-media TAR disk drive that also uses dedicated write synchronization regions and servo regions with discrete nondata blocks, but wherein the nondata blocks are not detected by the read head but by a separate radiation sensor responsive to the amount of optical power absorbed by the nondata blocks and the spaces between the blocks. Unlike the nondata islands in FIG. 3, in this invention the nondata blocks are not required to be formed of magnetic material because they are not intended to be detected by the magnetoresistive read head of the disk drive. The nondata blocks in the synchronization fields and servo sectors are separated by gaps that have an along-the-track length that optimizes the signal from the radiation sensor.

Figure 4A:
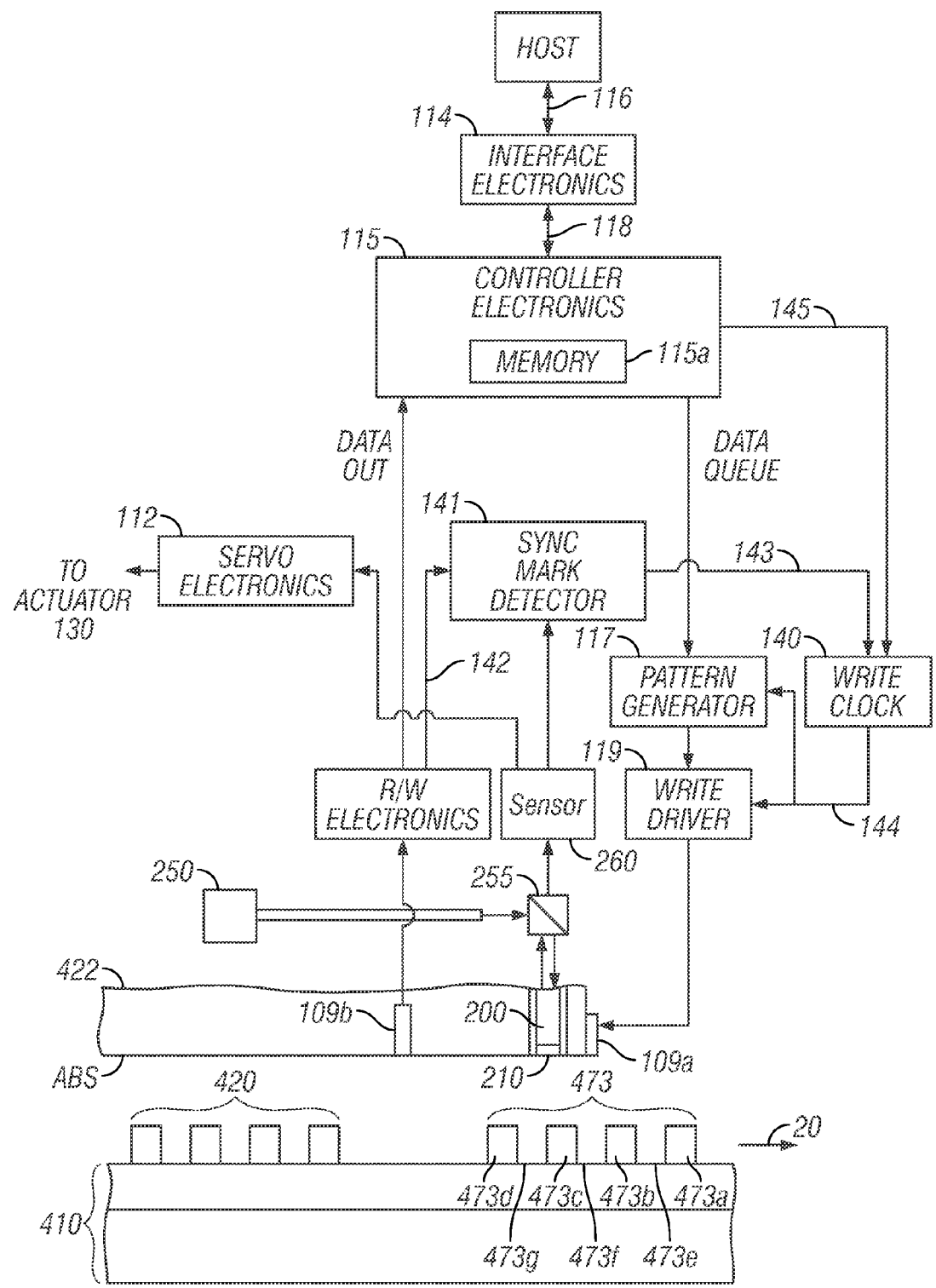
FIG. 4A is a block diagram of the electronics associated with a thermal-assisted recording (TAR) patterned-media disk drive according to the invention and also shows a sectional view of the nondata regions of the patterned magnetic recording disk.

FIG. 4A is a block diagram of the electronics associated with a TAR patterned-media disk drive and also shows a sectional view of the air-bearing slider 422 and magnetic recording disk 410 with a portion of the synchronization field 473 and the servo sector 420. The synchronization field 473 has patterned nondata blocks 473a-473d that function as sync marks and are separated by gaps 473e-473g. As shown in FIG. 4A, the blocks 473a-473d are peak regions, e.g., pillars, and the gaps 473e-473g are valley regions, e.g., recesses. The blocks may be formed of metallic or metallic alloy material, e.g., the same material as on the data islands, and the gaps formed of non-metallic material. The gaps may also be filled with nonmagnetic material, as in a planarized disk. The disk 410 also includes nondata servo sectors, like servo sector 420, that have nondata blocks and gaps, like the blocks and gaps in sync field 473, but that are patterned into servo marks, like TID marks and PES marks.

The slider 422 also supports an optical waveguide or channel 200, in addition to the read head 109b and write head 109a. The optical channel 200 has a near-field transducer (NFT) 210 at the disk-facing surface or air-bearing surface (ABS) of the slider 422. A radiation source 250, such as a diode laser, directs radiation through a beam splitter 255 to optical waveguide 200. The radiation strikes the NFT 210 creating concentrated near-field radiation as the disk rotates in the direction 20 past the slider 422. Radiation reflected from the NFT 210 is directed back through the optical waveguide 200 through beam splitter 255 to a radiation sensor 260. The reflected optical power depends on whether the NFT 210 has interacted with a block or a gap between blocks.

A "near-field" transducer, as used herein, refers to "near-field optics", wherein the passage of light is to, from, through, or near an element with subwavelength features and the light is coupled to a second element located a subwavelength distance from the first. NFTs typically use a low-loss metal (e.g., Au, Ag, Al or Cu) shaped in such a way to concentrate surface charge motion at a surface feature shaped as a primary apex or tip. Oscillating tip charge creates an intense near-field pattern. Sometimes, the metal structure can create resonant charge motion, called surface plasmons or local plasmons, to further increase intensity. The electromagnetic field of the oscillating tip charge then gives rise to optical output in the near field, which is directed to the data islands and nondata blocks on the disk. The NFT 210 has features less than the wavelength of the radiation from radiation source 250 and the spacing between the NFT 210 and the blocks and gaps is less than the wavelength of the radiation from the radiation source 250.

Figure 4B:
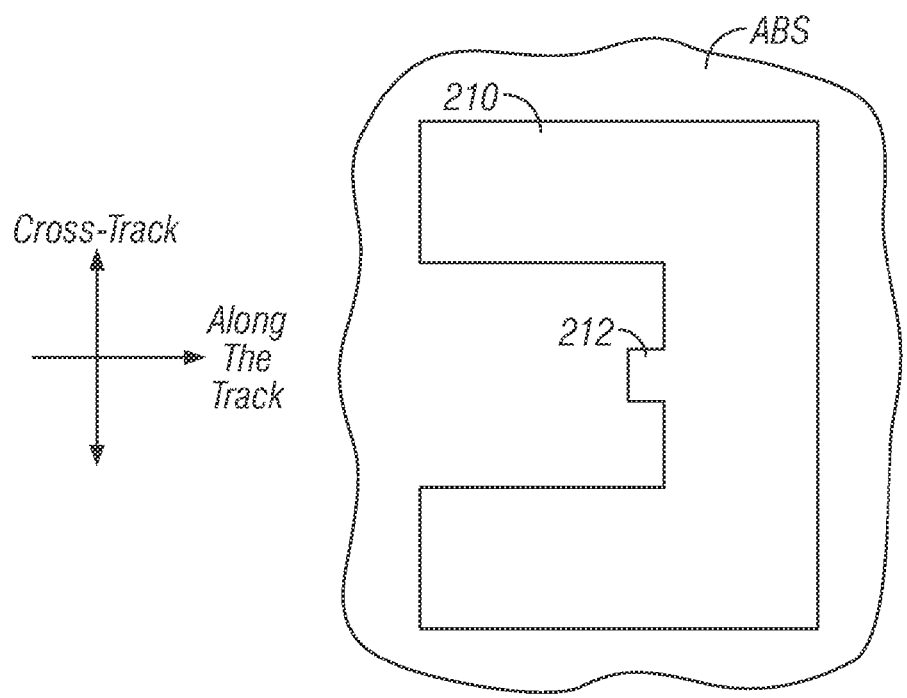
FIG. 4B is a view of a near-field transducer (NFT) as seen from the disk for use with the invention.

FIG. 4B is a view of the NFT 210 as seen from the disk and depicts the NFT 210 as an "E" shaped antenna with a primary tip 212. The "E" shape and the shape of the tip may be formed by e-beam lithography or optical lithography. The height of the metal film of the NFT 210 perpendicular to the substrate plane has a dimension preferably between about 75 to 125 nm. The distance between the inside corners of the NFT 210 in the cross-track direction may have a dimension of about 250 to 400 nm. The tip 212 has a cross-track width of about 10-40 nm and an along-the-track length of about 20-50 nm. The wavelength of the laser may be in the range 750 nm to 1000 nm to be matched to these E-antenna dimensions. When polarized light is aligned with the primary tip 212 of the E-antenna, an intense near-field pattern is created at the end of the tip 212. Resonant charge motion can occur at the primary tip 212 by adjusting the E-antenna dimensions to match a local plasmon frequency with the incident light wavelength. The NFT 210 focuses the input optical power to a very small spot on the surface of the disk adjacent the primary tip 212. In one example, for a gold NFT with a 24 nm wide primary tip 212 and a disk where the nondata blocks are cobalt islands 20 nm high with a 24 nm diameter, then more than 10% of the optical power in the waveguide is dissipated in a single cobalt island.

Figure 5:
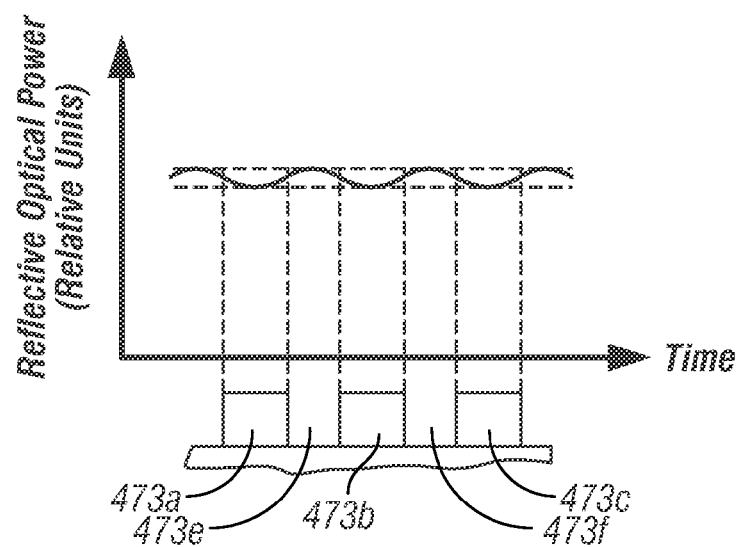
FIG. 5 is a graph of optical power (in relative units) reflected from the NFT as the blocks and gaps in the nondata regions move past the NFT in the invention.

The output signal from radiation sensor 260 represents the difference in reflected light intensity from the NFT-block coupled system and the NFT-gap coupled system. FIG. 5 is a graph of optical power (in relative units) reflected from the NFT 210 as the blocks and gaps move past the NFT 210, and represents the input to radiation sensor 260 as a function of time. The schematic of FIG. 5 incorporates the results of a computer-modeled simulation where the blocks are pillars with their tops spaced from the NFT by 8 nm and the gaps are recesses spaced from the NFT by 40 nm. The radiation sensor 260, which is preferably a photodiode, thus provides an output signal that represents this variation in reflected optical power as the disk rotates and the nondata blocks and gaps move past the NFT 210.

During the writing of data to the data islands the laser 250 is set to its write power setting so that radiation from NFT 210 heats the data islands to facilitate the magnetization reversal in the data islands by the magnetic field from the write head 109a. Also during writing, when the synchronization fields pass the NFT 210, the sensor 260 detects the radiation reflected from NFT 210 and thus detects the synchronization blocks 473a-473d and gaps 473e-473g. The sensor 260 output is sent to sync mark detector 141 to control the timing of write clock 140. Also during writing, when the servo fields 420 pass the NFT 210, the sensor 260 detects the radiation reflected from NFT 210 and thus detects the servo blocks and gaps, e.g., the TID servo marks and PES servo marks. The sensor 260 output is also sent to servo electronics 112 which controls the disk drive actuator 130 to maintain the write head 109a on track during writing.

During reading of data from the data islands by the read head 109b, when the servo fields 420 pass the NFT 210, the sensor 260 detects the radiation reflected from NFT 210 and thus detects the servo blocks and gaps, e.g., the TID servo marks and PES servo marks. Also, the laser 250 may have at least two power settings to provide the option of a lower power setting during reading that is less than the write power during writing. The laser's lower power is low enough to not raise the temperature of the magnetic material in the data islands to near its Curie temperature. The sensor 260 output is sent to servo electronics 112 which controls the disk drive actuator 130 to maintain the read head 109b on track during reading. Since there is typically a physical radial offset between the read head 109b and write head 109a on the slider, and because of skew due to the slider's arcuate path 135 (FIG.

1), the sensor 260, which is aligned with the write head 109a, will be detecting servo marks on a different track from the track being read by the read head 109b. The amount of read/write offset is a function of track number and is determined from a lookup table in the disk drive electronics, as is well-known in the art.

Figure 6A:
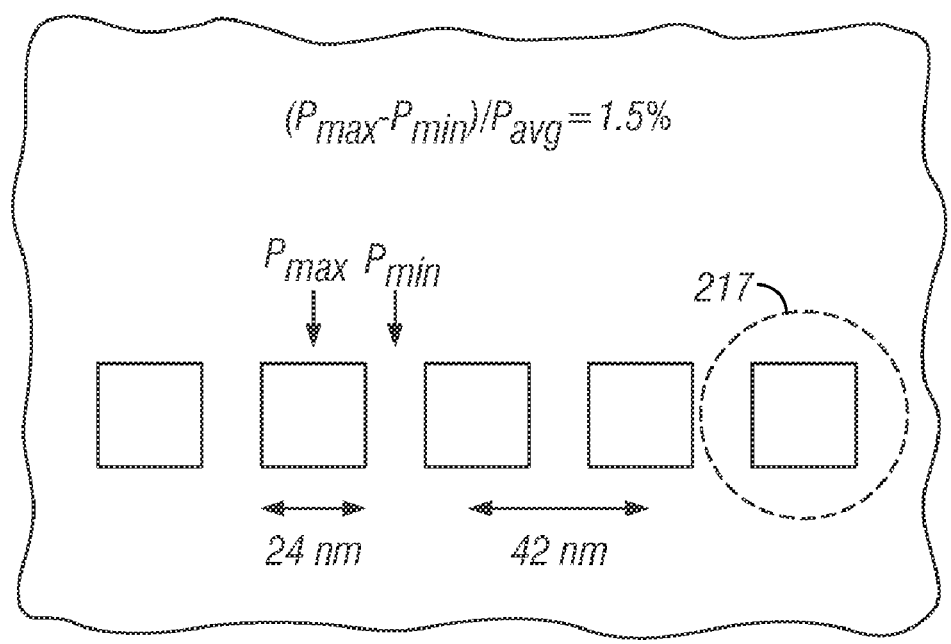
FIG. 6A is a representation of three nondata blocks in a computer simulation of the optical power absorption contrast between nondata blocks and gaps.
Figure 6B:
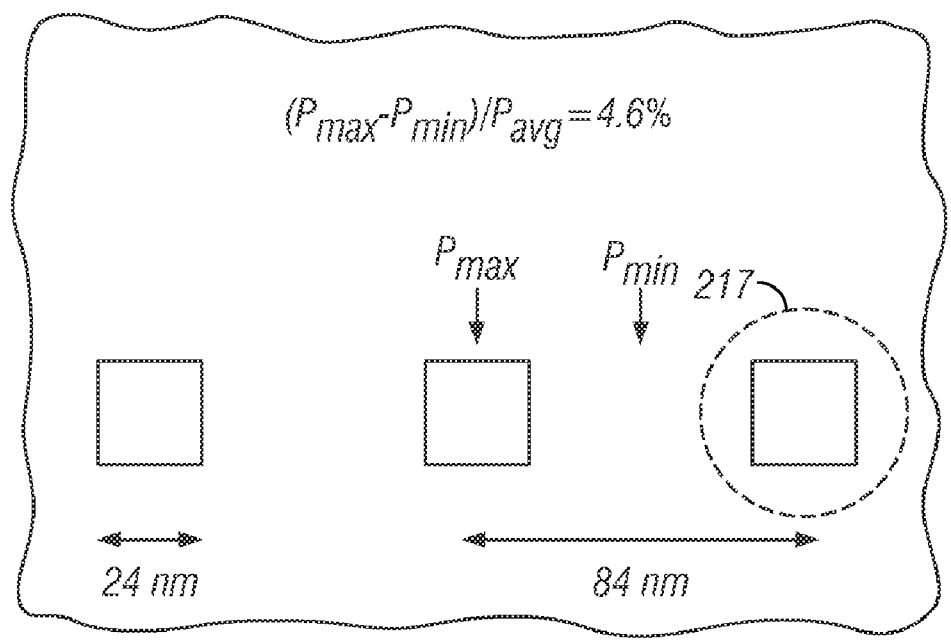
FIG. 6B is a representation of three nondata blocks in a computer simulation of the optical power absorption contrast between nondata blocks and gaps, but wherein there is a different along-the-track spacing of blocks from the representation in FIG. 6A.

In this invention the gaps between the nondata blocks in the along-the-track direction have an along-the-track length greater than the along-the-track length of the power absorption spot size produced by the NFT. FIG. 6A is a representation of three nondata blocks in a computer simulation of the optical power absorption contrast between nondata blocks and gaps. In this simulation each block is formed of metallic magnetic material. Co was used in the simulation, but magnetic materials such as Co/Pd multilayers, FePt alloys, or CoCrPt alloys give similar results. The gaps between the blocks are formed of air or a dielectric material like $SiO_2$. The separation between the NFT and the magnetic media was 8 nm, but similar results are achieved spacings under 10 nm. Each block is a 24 nm by 24 nm square with adjacent blocks having a center-to-center along-the-track spacing of 42 nm. The gaps between the blocks have an along-the-track length of 18 nm. The NFT produces an oscillating charge density at the tip that leads to a characteristic power absorption profile or spot with a radius of 24 nm, as depicted by the dashed circle 217. The power absorption spot is the area in a continuous metallic magnetic medium in which electromagnetic radiation would be absorbed if the NFT were brought within about 5-10 nm of the surface of that medium. The size and shape of the power absorption spot is determined by the particular geometry of the NFT. In the case of the E-antenna (FIG. 4B) the power absorption spot is a circle with approximately the same diameter as the cross-track width of the tip 212. The simulation shows that the optical absorption contrast above the average optical power absorbed is 1.5%. FIG. 6B shows a similar computer simulation of the optical power absorption contrast between nondata blocks and gaps, but wherein there is a different along-the-track spacing from that in FIG. 6A. In this simulation the gaps between the blocks have an along-the-track length of 60 nm, which is greater than the along-the-track spot size of 24 nm. The simulation shows that the optical absorption contrast above the average optical power absorbed has increased to 4.6%.

Figure 7:
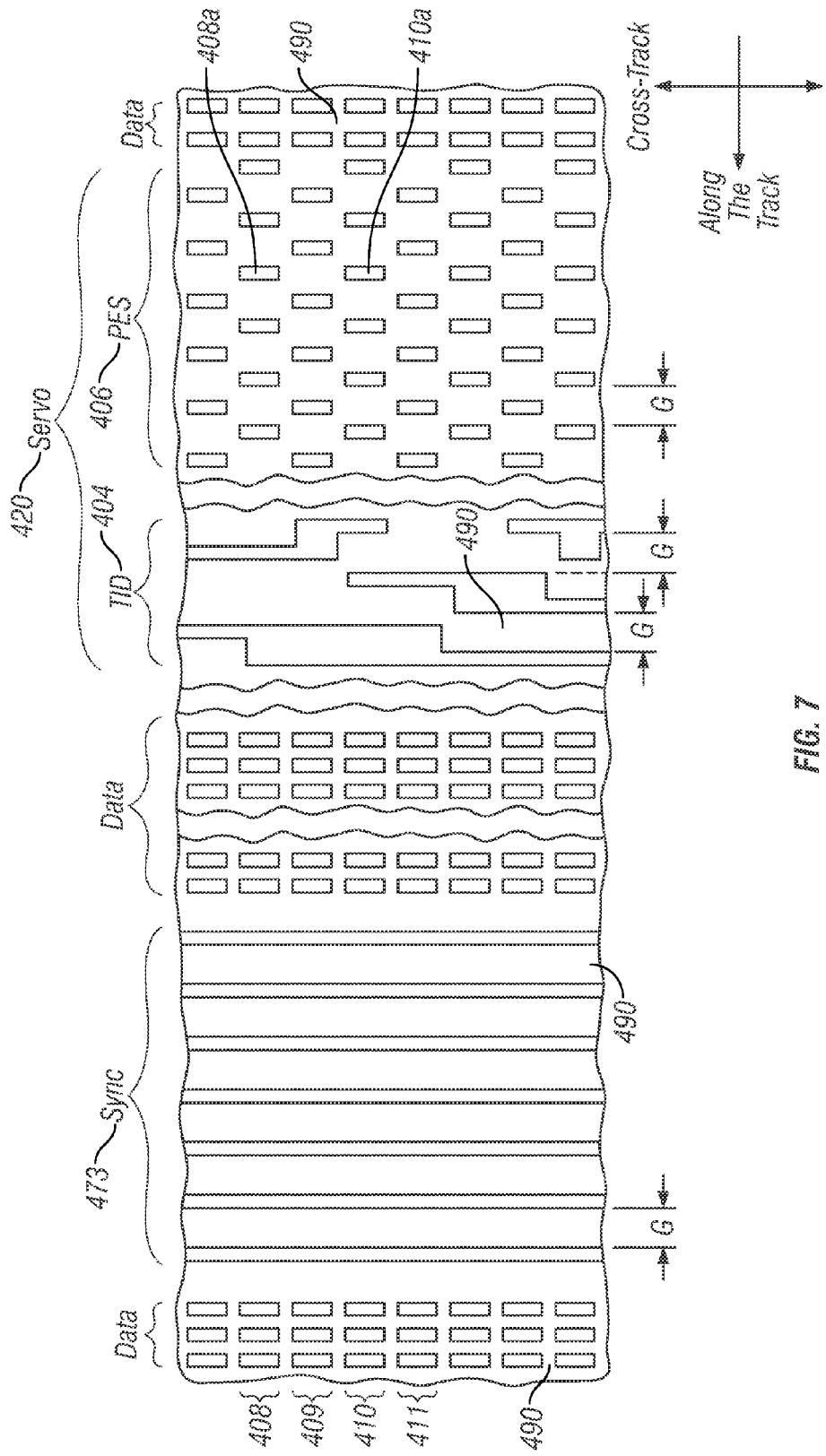
FIG. 7 is a view of a portion of the patterned-media disk according to the invention showing a nondata synchronization field and a nondata servo sector.

FIG. 7 is a view of a portion of the patterned-media disk according to the invention. Representative tracks, like tracks 408-411, are shown with data islands located between sync field 473 and servo field 420. The servo field 420 is depicted with a portion of the Gray-coded TID field 404 and the PES field 406. The PES blocks in PES field 406 are depicted as patterned into the well-known "null" servo pattern, but could be patterned into other types of PES patterns, such as the well-known quadrature pattern of four PES fields comprising groups of islands A-D as depicted in the prior art of FIG. 3. Each of the nondata blocks in the nondata fields 473, 404 and 406 is separated from adjacent nondata blocks by a gap G. The key design parameter for optimizing the radiation absorption contrast is to select the gap G to have an along-the-track length greater than the along-the track power absorption spot size. Preferably the cross-track spacing between radially adjacent nondata blocks is also greater than the cross-track power absorption spot size, as depicted for example by the servo blocks 408a and 410a. Because the nondata blocks may be patterned at the same time as the data islands, the nondata blocks are preferably formed of the same material as the data islands, i.e., any of the well-known ferromagnetic metal or metal alloys used or proposed for perpendicular magnetic recording media. Similarly the regions 490 surrounding the nondata blocks are typically nonmagnetic spaces formed of the same material as the regions 490 surrounding the data islands. The synchronization fields 473 and servo fields 420, which are interspersed with the data fields around the disk, can be detected while simultaneously writing data to the data fields.

Figure 8A:
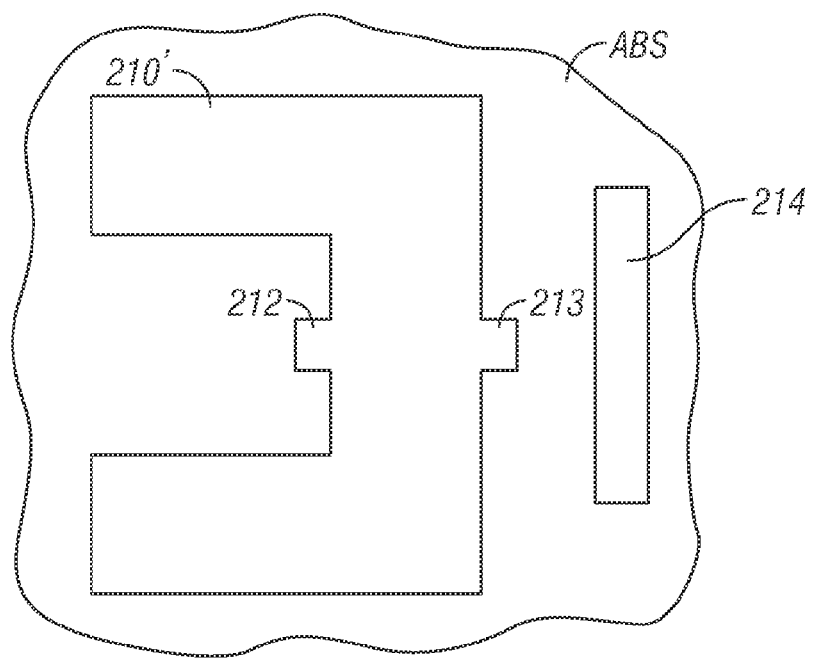
FIG. 8A is a view of a near-field transducer (NFT) as seen from the disk for use with the invention and shows the primary tip, a secondary tip, and an electrical conductor adjacent the secondary tip.

FIG. 8A is a view of a NFT 210', as seen from the disk, for use with a different embodiment of a radiation sensor 260'. The NFT 210' is like the NFT 210 in FIG. 4B but also includes a secondary tip 213 with substantially the same shape as the primary tip 212. The secondary tip 213 is located near an electrical conductor 214. The conductor 214 may be an electrically conductive "nanowire" whose resistance changes with temperature. When polarized light is aligned with the primary tip 212 of the E-antenna, an intense near-field pattern is created at the end of the tip 212. Resonant charge motion can occur at the primary tip 212 by adjusting the E-antenna dimensions to match a local plasmon frequency with the incident light wavelength. The NFT 210' focuses the input optical power to a very small spot on the surface of the disk adjacent the primary tip 212.

The secondary tip 213 forms part of the NFT 210' and is located at a local maximum in the charge density oscillation. The secondary tip 213 further concentrates the charge in the gold NFT 210' to create an intense near-field pattern similar to the pattern of the primary tip 212. The secondary tip 214 causes a temperature rise in the disk that is only about 15% of the peak temperature rise caused by the primary tip 212. The electrically conducting nanowire (conductor 214) is located adjacent to the secondary tip 213 and is heated by the optical near-field generated by the secondary tip 213. The degree of nanowire heating is influenced by the amplitude of the charge density oscillation in the NFT 210'. At constant input power from the laser light source, the amplitude of the charge density oscillation in the NFT 210' will be most affected by the region of the disk, either a nondata block or a gap, directly adjacent the primary tip 212. The charge density oscillation amplitude (and thus nanowire heating) is affected by any region that changes the total optical power delivered to the disk. For example, if a single cobalt nondata block is located adjacent primary tip 212, about 10% of the incident optical power is dissipated in the block, which means that the charge density oscillation is smaller at the secondary tip 213, resulting in a reduction in heating of the nanowire. When the block passes the primary tip 212, and a gap is located adjacent the primary tip 212, the charge density oscillation increases and this increases the optical power delivered to the nanowire by the secondary tip 213 and thus increases the temperature of the nanowire.

Figure 8B:
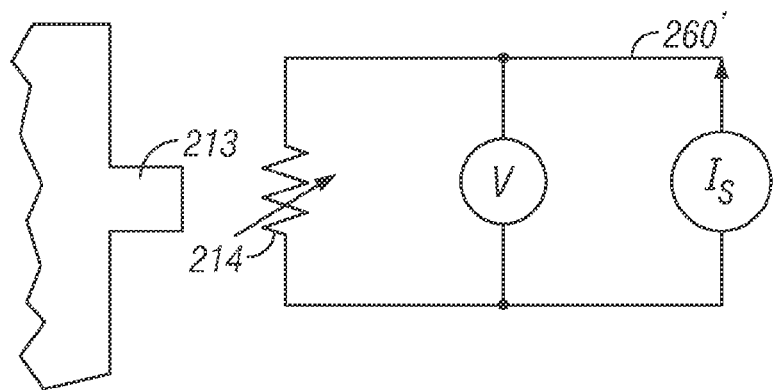
FIG. 8B is a simple circuit that functions as a radiation sensor in this invention.

FIG. 8B is a simple circuit that represents the radiation sensor 260' for illustrating how the nanowire (conductor 214) functions as a variable resistor in response to changes in temperature caused by heating (and cooling) as the amplitude of charge density oscillation changes in the secondary tip 213. A current source $I_s$ supplies a constant current to the conductor 214 and the change in temperature changes the resistance which is detected as a change in voltage of sensor 260'. The voltage output of sensor 260' is input to sync mark detector 141 and servo electronics 112, in the manner described with respect to FIG. 4A. The blocks are closer to primary tip 212 than the gaps and thus dissipate more optical power from the primary tip 212, which reduces the optical power delivered by secondary tip 213 to conductor 214. This reduces the heating of conductor 214 and thus the resistance, resulting in a drop in voltage. The gaps can be filled with non-metallic material so that the disk is substantially planar with the blocks being metallic. Then the voltage drops of sensor 260' would represent the presence of metallic regions adjacent the primary tip 212.

The nanowire 214 may be any electrically conducting material that exhibits a change in resistance (dR) with a change in temperature (dT). To maximize the signal-to-noise ratio (SNR) from the nanowire, the material should have a large dR/dT while the resistance should be smaller than approximately 1 k-ohm to reduce the RC time constant and shot noise. Preferably the nanowire is formed of metal or metal alloy. However, the nanowire may be a thermistor material, a semiconductor, or two materials to form a thermocouple junction, or may be a tunneling junction. In the case of a simple metallic nanowire heated to 100° C. above ambient temperature, the passing of a metal block may reduce the temperature by approximately 20° C., which would result in approximately a 10% drop in resistance.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A thermal assisted recording (TAR) patterned-media magnetic recording disk drive comprising:
   a rotatable magnetic recording disk having a plurality of concentric data tracks, each data track patterned into discrete magnetizable data islands separated by nonmagnetic spaces, and a plurality of angularly spaced nondata regions extending generally radially across the data tracks, each nondata region patterned into discrete blocks separated by gaps in the along-the-track direction;
   a write head for applying a magnetic field to the data islands;
   a laser light source;
   an optical channel and near-field transducer for directing radiation from the light source to the disk to heat the data islands, the near-field transducer generating a power absorption profile on the disk with a characteristic along-the-track spot size less than the along-the-track length of the gaps between the nondata blocks;
   a carrier for supporting the write head and near-field transducer, the carrier having a disk-facing surface maintained at a distance less than the wavelength of the laser light from the disk; and
   a sensor for sensing radiation from the nondata blocks and gaps in the nondata regions as the disk rotates.

2. The disk drive of claim 1 wherein the nondata regions are synchronization fields and the blocks in the synchronization fields are synchronization marks detectable by the radiation sensor for synchronizing the writing of data to the data islands by the write head.

3. The disk drive of claim 1 wherein the nondata regions are servo sectors and the blocks in the servo sectors are track identification (TID) marks detectable by the radiation sensor for identifying the data tracks by number.

4. The disk drive of claim 1 wherein the nondata regions are servo sectors and the blocks in the servo sectors are position error signal (PES) marks detectable by the radiation sensor for positioning the write head in the data tracks.

5. The disk drive of claim 4 wherein the PES marks in the servo sectors are patterned into a null servo pattern disk.

6. The disk drive of claim 1 further comprising a write clock responsive to said sensor and coupled to the write head for controlling the timing of the magnetic field applied to the data islands by the write head.

7. The disk drive of claim 1 further comprising servo electronics responsive to said sensor for controlling the positioning of the write head on the data tracks.

8. The disk drive of claim 1 wherein the nondata blocks comprise metallic or metallic alloy material and the gaps between the blocks comprise non-metallic material.

9. The disk drive of claim 1 wherein the disk has a surface topography with regions of peaks and regions of valleys, and wherein the nondata blocks are peaks and the gaps between the blocks are valleys.

10. The disk drive of claim 1 wherein the magnetizable data islands are magnetizable substantially perpendicular to the plane of the disk.

11. The disk drive of claim 1 wherein the radiation sensor is responsive to radiation reflected from the near-field transducer through the optical channel.

12. The disk drive of claim 11 wherein the radiation sensor comprises a photodetector.

13. The disk drive of claim 1 wherein the near-field transducer has a primary tip at said disk-facing surface for heating the islands as the disk rotates and a secondary tip spaced from the primary tip, and wherein said radiation sensor comprises an electrical conductor on the carrier near the secondary tip, the electrical conductor being heated by the secondary tip and exhibiting a change in electrical resistance in response to a change in temperature, and electrical circuitry coupled to the electrical conductor and providing an output signal representative of change in electrical resistance of the sensor.

14. A thermal assisted recording (TAR) patterned-media magnetic recording disk drive comprising:
   a rotatable magnetic recording disk having a plurality of concentric data tracks, each data track patterned into discrete magnetizable data islands separated by nonmagnetic spaces, and a plurality of angularly spaced nondata synchronization fields extending generally radially across the data tracks, each nondata synchronization field patterned into discrete nondata blocks separated by gaps in the along-the-track direction;
   a write head for applying a magnetic field to the data islands;
   a laser light source;
   an optical channel and near-field transducer for directing radiation from the light source to the disk to heat the data islands, the near-field transducer generating a power absorption profile on the disk with a characteristic along-the-track spot size less than the along-the-track length of the gaps between the nondata blocks;
   a carrier for supporting the write head and near-field transducer, the carrier having a disk-facing surface maintained at a distance less than the wavelength of the laser light from the disk;
   a sensor providing an output signal in response to radiation from the nondata blocks and gaps in the synchronization fields as the disk rotates; and
   a write clock responsive to said sensor output signal and coupled to the write head for controlling the timing of the magnetic field applied to the data islands by the write head.

15. The disk drive of claim 14 wherein the nondata blocks comprise metallic or metallic alloy material and the gaps between the blocks comprise non-metallic material.

16. The disk drive of claim 14 wherein the disk has a surface topography with regions of peaks and regions of valleys, and wherein the nondata blocks are peaks and the gaps between the blocks are valleys.

17. The disk drive of claim 14 wherein the radiation sensor is responsive to radiation reflected from the near-field transducer through the optical channel.

18. The disk drive of claim 14 wherein the near-field transducer has a primary tip at said disk-facing surface for heating the islands as the disk rotates and a secondary tip spaced from the primary tip, and wherein said radiation sensor comprises an electrical conductor on the carrier near the secondary tip, the electrical conductor being heated by the secondary tip and exhibiting a change in electrical resistance in response to a change in temperature, and electrical circuitry coupled to the electrical conductor and providing an output signal representative of change in electrical resistance of the sensor.

19. A thermal assisted recording (TAR) patterned-media magnetic recording disk drive comprising:
   a rotatable magnetic recording disk having a plurality of concentric data tracks, each data track patterned into discrete magnetizable data islands separated by nonmagnetic spaces, and a plurality of angularly spaced nondata servo sectors extending generally radially across the data tracks, each nondata servo sector patterned into discrete nondata servo blocks separated by gaps in the along-the-track direction;
   a write head for applying a magnetic field to the data islands;
   a laser;
   an optical channel and near-field transducer for directing radiation from the laser to the disk to heat the data islands, the near-field transducer generating a power absorption profile on the disk with a characteristic along-the-track spot size less than the along-the-track length of the gaps between the nondata servo blocks;
   a carrier for supporting the write head and near-field transducer, the carrier having a disk-facing surface maintained at a distance less than the wavelength of the laser light from the disk;
   a sensor providing an output signal in response to radiation from the nondata servo blocks and gaps in the servo sectors as the disk rotates; and
   servo electronics responsive to said sensor output signal for controlling the positioning of the write head on the data tracks.

20. The disk drive of claim 19 wherein the laser is capable of providing a write power output for heating the data islands in the presence of the magnetic field from the write head and a lower power output less than the write power output, and further comprising a read head on the carrier for reading of data from the data islands, and wherein the laser is at said lower power output during reading.

21. The disk drive of claim 19 wherein the nondata servo blocks are track identification (TID) marks detectable by the radiation sensor for identifying the data tracks by number.

22. The disk drive of claim 19 wherein the nondata servo blocks are position error signal (PES) marks detectable by the radiation sensor for positioning the write head in the data tracks.

23. The disk drive of claim 19 wherein the nondata servo blocks comprise metallic or metallic alloy material and the gaps between the blocks comprise non-metallic material.

24. The disk drive of claim 19 wherein the disk has a surface topography with regions of peaks and regions of valleys, and wherein the nondata servo blocks are peaks and the gaps between the blocks are valleys.

25. The disk drive of claim 19 wherein the radiation sensor is responsive to radiation reflected from the near-field transducer through the optical channel.

26. The disk drive of claim 19 wherein the near-field transducer has a primary tip at said disk-facing surface for heating the islands as the disk rotates and a secondary tip spaced from the primary tip, and wherein said radiation sensor comprises an electrical conductor on the carrier near the secondary tip, the electrical conductor being heated by the secondary tip and exhibiting a change in electrical resistance in response to a change in temperature, and electrical circuitry coupled to the electrical conductor and providing an output signal representative of change in electrical resistance of the sensor.

* * * * *